US012639552B2

(12) United States Patent
Kojima et al.

(10) Patent No.: US 12,639,552 B2
(45) Date of Patent: May 26, 2026

(54) RECONFIGURABLE WAVELENGTH SELECTIVE SPLITTER

(71) Applicant: Mitsubishi Electric Research Laboratories, Inc.

(72) Inventors: Keisuke Kojima, Weston, MA (US); Minwoo Jung, Ithaca, MA (US); Toshiaki Koike Akino, Belmont, AL (US); Ye Wang, Andover, AL (US); Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 777 days.

(21) Appl. No.: 18/055,002

(22) Filed: Nov. 14, 2022

(65) Prior Publication Data

US 2023/0367997 A1     Nov. 16, 2023

Related U.S. Application Data

(60) Provisional application No. 63/364,431, filed on May 10, 2022.

(51) Int. Cl.
    *G06N 3/0455*       (2023.01)
    *G02F 1/137*       (2006.01)
    *G06N 3/088*       (2023.01)

(52) U.S. Cl.
    CPC ........... *G06N 3/0455* (2023.01); *G02F 1/137* (2013.01); *G06N 3/088* (2013.01)

(58) Field of Classification Search
    CPC .... G06N 3/0455; G06N 3/088; G06N 3/0464; G06N 3/047; G06N 3/0475; G06N 3/0499; G06N 3/091; G06N 3/094; G02F 1/137
    See application file for complete search history.

(56) References Cited

U.S. PATENT DOCUMENTS

2021/0281349 A1 * 9/2021 Kojima ............... H04J 14/0215

FOREIGN PATENT DOCUMENTS

JP        47766370       9/2011

* cited by examiner

*Primary Examiner* — James C. Jones
(74) *Attorney, Agent, or Firm* — Gene Vinokur

(57) ABSTRACT

A reconfigurable device is provided for splitting optical beams. The device includes an input port configured to receive an input beam including at least two primary wavelengths, a tunable splitter configured to separate the input beam into at least two beams via at least two routes corresponding to the at least two primary wavelengths, wherein each of the at least two routes is configured to propagate one of the at least two primary wavelengths of the input beam, wherein the tunable splitter includes a bottom electrode, a substrate on the bottom electrode, core segments arranged on the substrate, a top layer, support segments to connect the substrate and the top layer, a top electrode on the top layer, a controllable refractive index layer arranged to fill gaps between the substrate, the support segments, and the top layer; and at least two output ports configured to transmit the at least two beams propagated via the at least two routes.

9 Claims, 16 Drawing Sheets

500

900

901 — 15000 Binary input patterns

902 — Training the first CVAE model

903 — Generate 1000 devices with different splitting ratio

904 — Label using FDTD simulation

905 — Combine with the previous 15000 data

906 — Training the second CVAE model

907 — Final model

RECONFIGURABLE WAVELENGTH SELECTIVE SPLITTER

FIELD OF THE INVENTION

The invention generally related to method and system for training a device design network for use conditional variational autoencoder to randomly generate materials, device, or structural designs.

BACKGROUND OF THE INVENTION

In many areas of materials, devices, and structures, designing is a challenge because tens, hundreds, or even more parameters need to be optimized simultaneously, and each simulation or experiment to verify the updated chrcteristics for new parameter sets takes a long time. So efficient optimization methods are desired.

Inverse design of optical devices using deep neural network for regression in forward or inverse directions have been done before. (Tahersima et al., Scientific Reports). Once the inverse model is fully trained, it can theoretically generate the design parameters for us. However, the previous inverse neural network model is for optimizing the binary structure (such as 0 or 1), which reduce the dimension of the actual optimization problem. This may bring up some limitations such as narrower bandwidth and semi optimized result which requires to be further optimized. There is a need to construct a better generative model to be used for more sophisticated optimization problems.

SUMMARY OF THE INVENTION

The invention proposes to use a conditional variational autoencoder, combined with an adversary network to randomly generate device designs wherein desired device performances are given as input conditions. Active training (co-training) can be added for further improving the performance.

Some embodiments of the present disclosure use silicon as the waveguide material and silicon dioxide as the cladding material. Some embodiments use silicon nitride as the waveguide material and silicon dioxide as the cladding material.

Some of the embodiments use liquid crystal as the reconfigurable material. Liquid crystal has anisotropic refractive index, and by applying electric field, the axis of oriental can be changed, along with the refractive index in each direction.

Some of the embodiments have one input port and at least two output ports. Some of the embodiments have nanostructures designed by the adjoint method, while some of the embodiments have nanostructures designed by deep learning.

In according to some embodiments of the present disclosure, the model structure is a Conditional Variational Auto Encoder along with the adversarial block, which is based on Bayesian Theorem. It wants the model to underlie the probability distribution of data so that it could sample new data from that distribution. Our training data are generated by doing FDTD simulations. The data are constructed by the following: several adjoint optimization method.

According to some embodiments of the present invention, a system for training a device design network for generating a layout of a device is provided. The system may include an interface configured to acquire input data of a device;

a memory to store the device design network including first and second encoders, first and second decoders, and first and second adversarial blocks; and a processor, in connection with the memory, configured to: update the first and second encoders and the first and second decoders based on a first loss function and a third loss function to reduce a difference between the input data and output data of the first and second decoders; and update the first and second adversarial blocks by maximizing a second loss function.

Further, some embodiments of the present invention can provide a computer-implemented training method for training a device design network. In this case, the method comprising steps of: acquire input data of a device via an interface; update first and second encoders and first and second decoders based on a first loss function and a third loss function to reduce a difference between the input data and output data of the first and second decoders; and update first and second adversarial blocks by maximizing a second loss function.

Yet further, some embodiments of the present invention are based on recognition that a computer-implemented method can be provided for generating a layout of a device using a device generating network. The computer-implemented method may include steps of acquiring input data of the device via an interface; feeding the input data into the device generating network, wherein the device generating network is pretrained by a computer-implemented training method, wherein the computer-implemented training method is configured to acquire input data of a device via an interface; update first and second encoders and first and second decoders based on a first loss function and a third loss function to reduce a difference between the input data and output data of the first and second decoders; and update first and second adversarial blocks by maximizing a second loss function. The computer-implemented method further includes generating layout data of the layout of the device using the pretrained device generating network and storing the layout data into a memory.

Furthermore, another embodiment of the present invention provides a computer-implemented training method for training a conditional Variational Autoencoder (CVAE) network generating a device pattern. The method includes steps of acquiring input data of a device from training datasets into two channel input of the CVAE network from a training dataset via a data communication interface, wherein the CVAE network includes an encoder-decoder block and a decoder-encoder block; updating the CVAE network based on a sum of a first loss function and a third loss function to reduce a difference between input data and output data of the first and second encoders and the first and second decoders; and updating first and second adversarial blocks by minimize a second loss function, wherein the steps of acquiring input data, updating the CVAE network, and updating the first and second adversarial blocks are continued until predetermined datasets in the training dataset or all of the training datasets are used.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
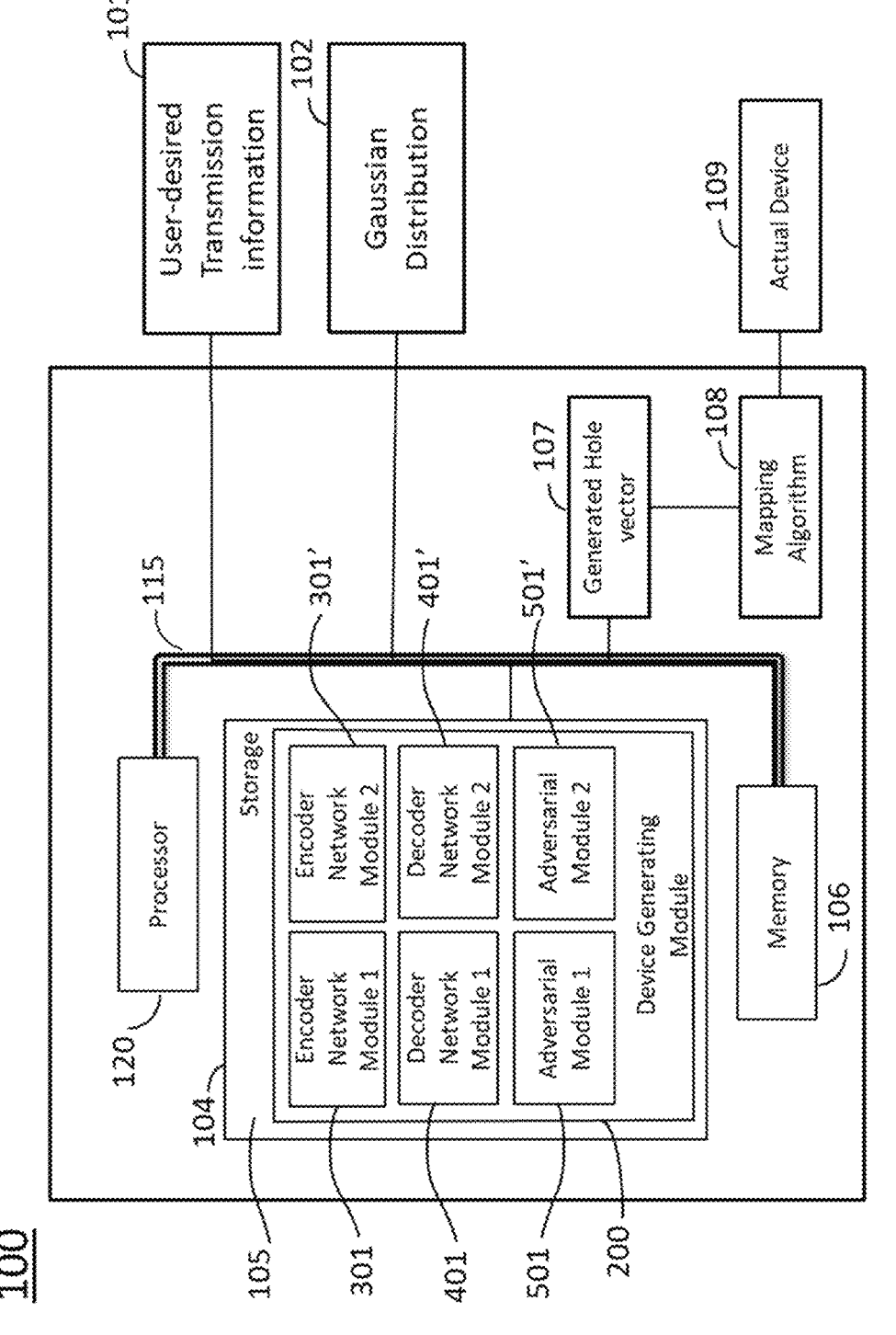
FIG. 1 shows the overall configuration of system, according to embodiments of the present invention.

FIG. 1 is the general structure of the system 100 including a neural network modules trained to provide a layout of a device, according to some embodiments of the present invention. The system 100 includes an interface 115, a processor 120, a storage 104, a memory 106. The storage 104 consisting of a storage circuitry 105 includes a device generating module 200 that includes encoder network modules 301 and 301', decoder network modules 401 and 401' and adversarial module (blocks) 501 and 501'. In some cases, the storage circuitry 105 may include the memory (unit) 106. The storage 104 may include a mapping algorithm 108 configured to generate a layout of an actual device 109, or the mapping algorithm 108 may be stored into another memory (not shown). The interface (data communication interface) 115 is configured to communicate between the memory 106, the storage 104, the processor 120 and the mapping algorithm 108. The interface 115 is also configured to receive (acquire) input data including a user-desired transmission information 101 (e.g. extinction ratio) and a Gaussian distribution 102 via an input device outside the system 100. In some cases, the user-desired transmission information 101 and Gaussian distribution 102 may be stored into the memory 106 or the storage 104. The desired transmission information 101 and the standard Gaussian distribution 102 are fed to the encoder and decoder neural network modules 301, 301', 401 and 401' via an interface. The neural network modules 301, 301', 401, 401', 500 and 500' are pretrained, such that the system 100 can generate the corresponding hole vector pattern 107 of the device. The system 100 applies the mapping algorithm 1000, to draw/generate a layout of the actual device. Such network has been verified under a square based splitter model 1100 as one of embodiments of the present invention. Although the following embodiments of the present invention exemplary show the square based splitter model, it should be noted that the shape of the splitter (model) is not limited to a square.

5 | 6

For instance, other shapes including rectangular, circular, oval, symmetry shapes, asymmetry shapes or an arbitrary shape that includes any of them may be used. In this case, such a splitter is configured to include an input port configured to receive an input beam having an input power, a power splitter including perturbation segments arranged in a first region and a second region of a guide material having a first refractive index, each segment having a second refractive index, wherein the first region is configured to split the input beam into a first beam and a second beam, wherein and the second region is configured to separately guide the first and second beams, wherein the first refractive index is greater than the second refractive index, and output ports including first and second output ports connected the power splitter to respectively receive and transmit the first and second beams.

Once the neural network modules are fully trained, the system can generate the splitter with any arbitrary splitting ratio the users want instantly. Some results using the system 100 indicate that those devices have the overall transmission at around 93% across a very broadband, which is really hard (in terms of time and efficiency) to get by using conventional methods such as Direct Binary Search (DBS). Comparing with another result obtained our another system that only includes the encoder network module-1 301, decoder network module-1 401 and the adversarial module-1 500 for training process, but does not include the encoder network module-2 301', decoder network module-2 401' adversarial module-2 501', the results according to the present invention show a significant improvement from our previous system.

Figure 2:
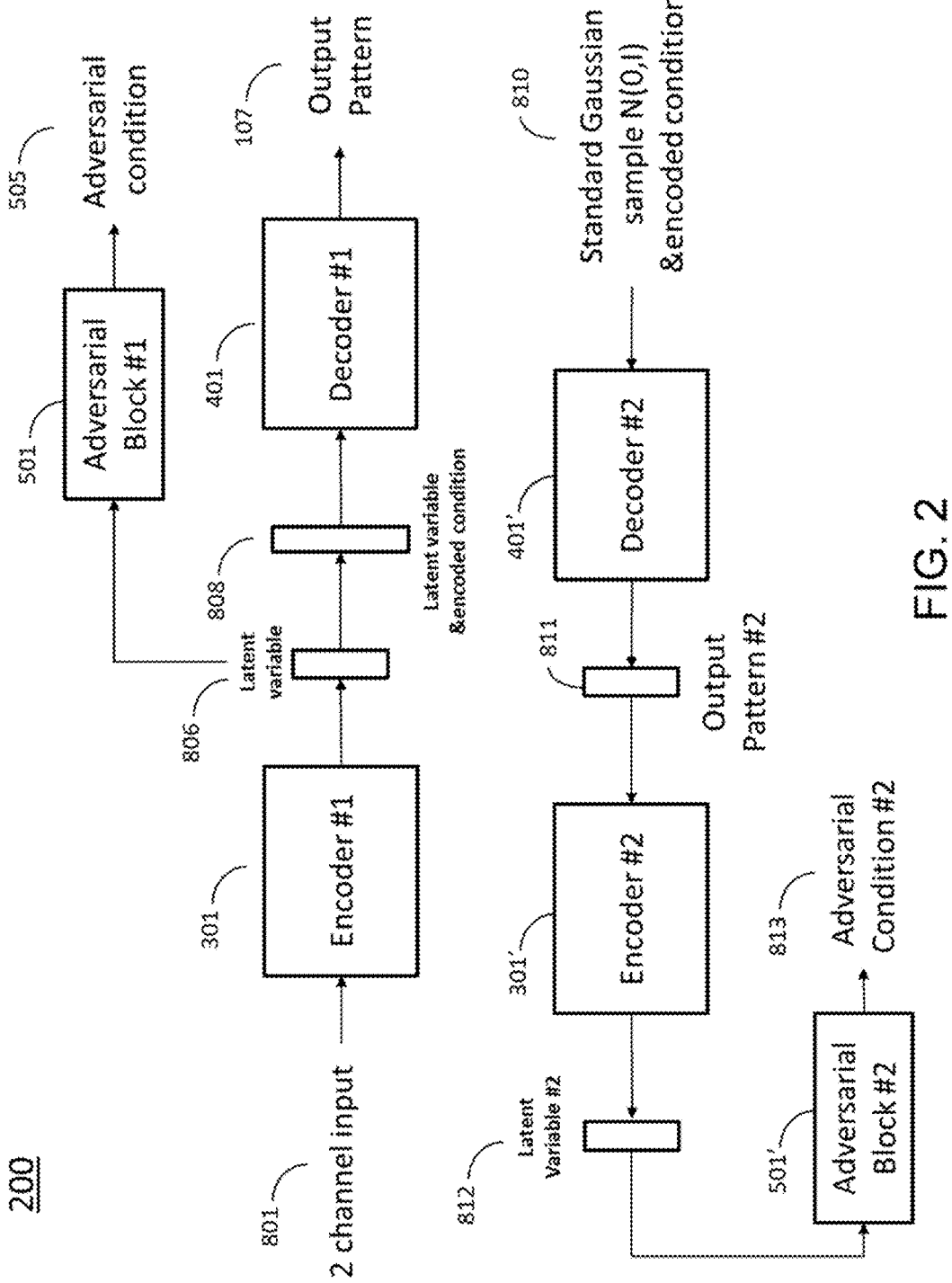
FIG. 2 shows the general adversarial CVAE network, according to embodiments of the present invention.

FIG. 2 shows the overall structure of the neural network model (device generating module) 200. The model 200 is constructed with six parts: two encoders (301, 301'), two decoders (401, 401') and two adversarial blocks (501, 501') (as shown in the FIG. 100). Encoder #1 and #2 (30) have the same structure and share the same weighs. Decoder #1 and #2 (401) have the same structure and share the same weights. Same standard applies to the adversarial blocks (501) as well. The encoder #1 (301) is configured to extract the input pattern features (801) and represent it using probability distribution which is defined as latent variable (806). The decoder #1 (401) has the similar structure to the encoder #1 (301) but in a reverse order. The decoder #1 is configured to generate the device pattern with the latent variable and the encoded condition (107). For the second decoder-encoder set: The decoder #2 (401') takes the standard Gaussian samples along with the encoded condition (801) to generate a second output pattern (811) which will be used later in the loss function. The encoder #2 (301) then takes the second output pattern (811) to generate the second latent variable set (812). Output pattern #2 and Latent Variable #2 are only used for the training (to calculate the loss function). For the final model, we will use the trained decoder (401).

Figure 3:
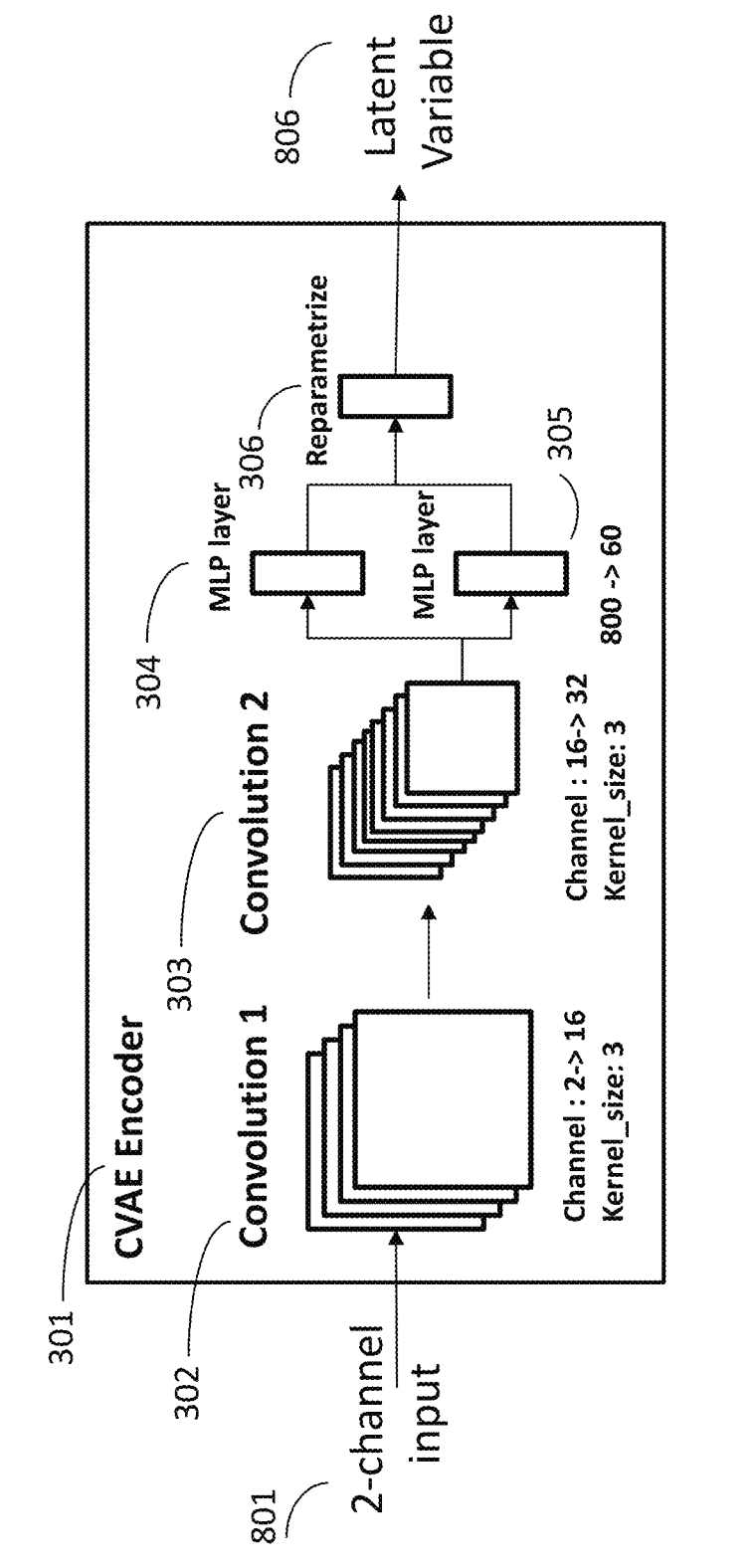
FIG. 3 shows the detailed structure of the CVAE encoder block, according to embodiments of the present invention.

FIG. 3 shows the detailed structure of the encoders #1 (301), and #2 (301'), in which the encoders (301 and 301') have an identical structure. Each of the encoders 301 and 301' is constructed by two convolutional layers (302 & 303), (one has 8 channel the second one has 16 channel), followed by two parallel Multilayer Perceptron (MLP) layer (304 & 305). Each of the two parallel MLP layers (304 and 305) may be parallel fully connected layers. In some cases, each of the two parallel MLP layers (304 and 305) includes more than two inputs. For instance, the two parallel MLP layers are configured to have 800->60 input->output dimensions, to generate the extracted pattern (mean (μ) and covariance (σ) for the Gaussian distribution). In order to get the latent variable, the re-parametrization (306) of the mean and the covariance needs to be applied. The equation of the re-parameterization is shown below in Equation 1:

$$\text{Latent Variable} = \mu + \left(e^{\frac{\sigma}{2}} * N\right), \tag{1}$$

where the N is the random number which obey the standard Gaussian distribution (with mean of 0 and covariance of 1).

Figure 4:
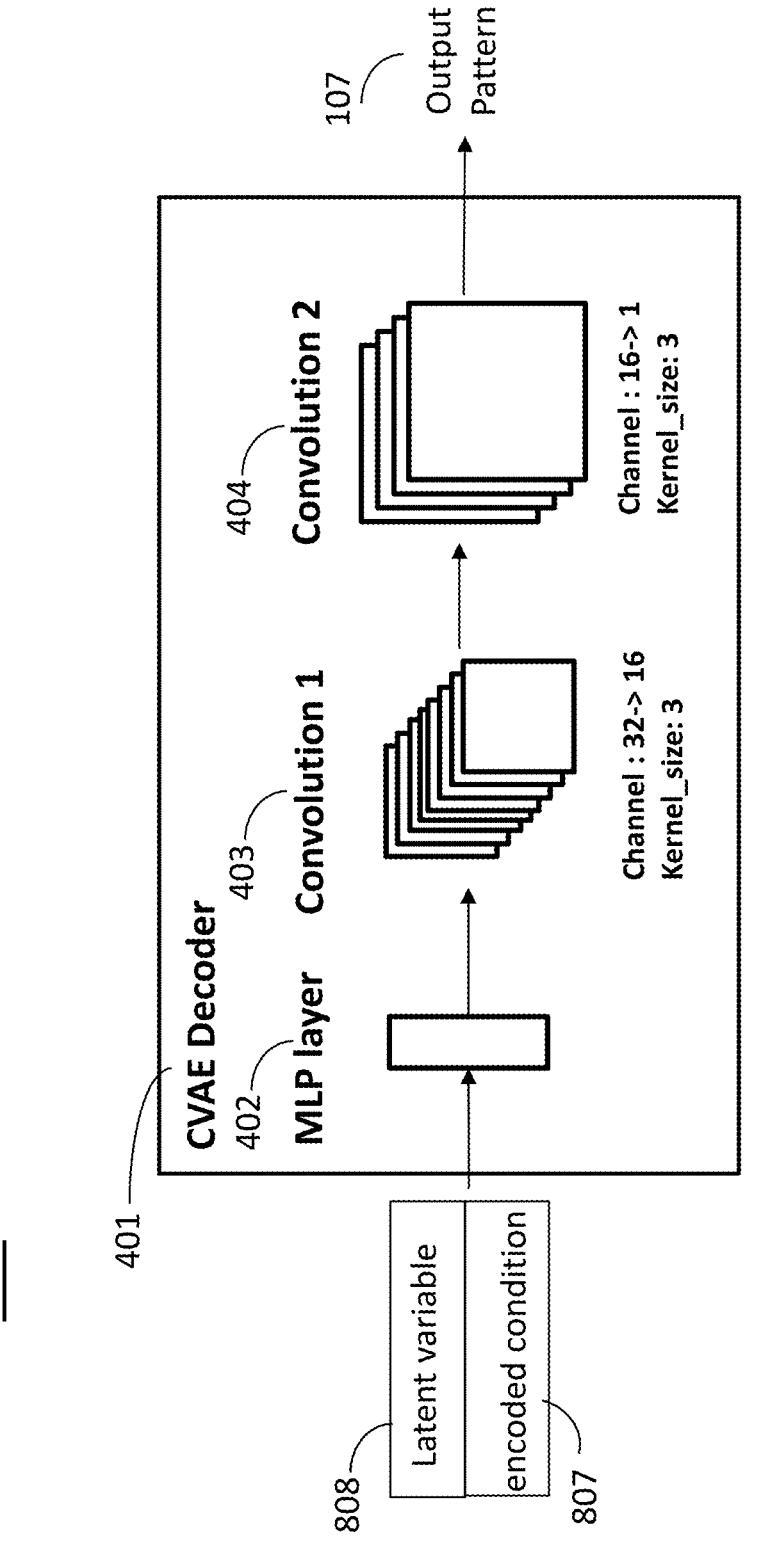
FIG. 4 shows the detailed structure of the CVAE decoder block, according to embodiments of the present invention.

FIG. 4 shows the detailed structure of the decoders #1 and #2 (401 and 401'), in which the decoders have an identical structure. The latent variable 808 from the encoder (806) and the encoded condition data (807) are concatenated to form the input for the decoder. Then the combined data are fed into the decoder (401) to generate the pattern. The decoder 401 includes one Multilayer perceptron (MLP) layer (402) and two convolutional layers (403 & 404). The MLP layer has the input->output dimension of 69->800. In some cases, each of the two convolutional layers (403 and 404) may be designed to have more than 2 channels. For instance, the two convolutional layers have the following specs: first convolutional layer (403) has 8 channel the second convolutional layer (404) has 16 channels. The output of second convolutional layer is the generated (or reconstructed) pattern (107). The final model used to generate different devices.

Figure 5:
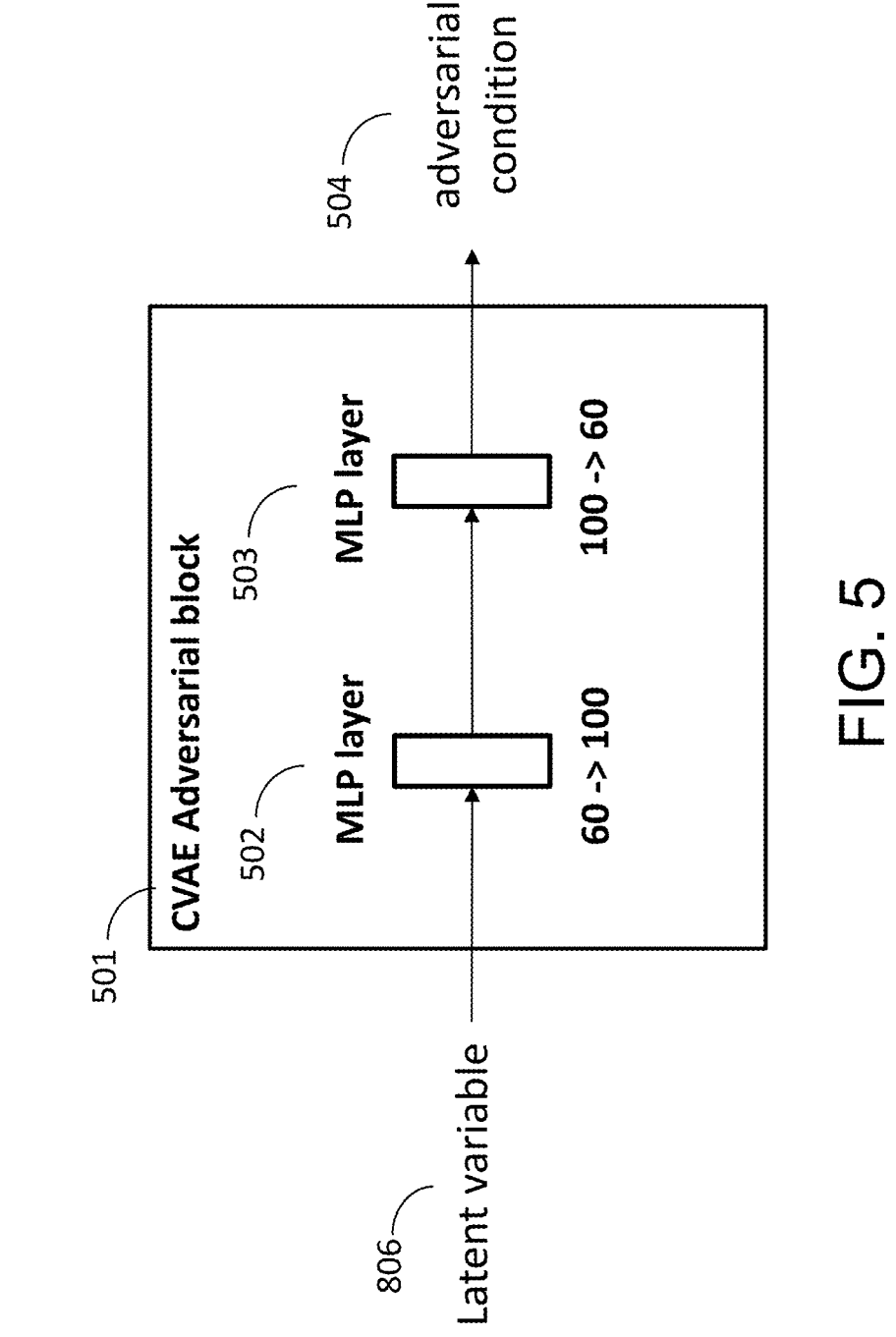
FIG. 5 shows the detailed structure of the adversarial block, according to embodiments of the present invention.

FIG. 5 shows the detailed structure of the adversarial blocks #1 and #2 (501 and 501'), in which the adversarial blocks have an identical structure. Each of the adversarial blocks (501 and 501') has two MLP layers (502 & 503) (the first one has 60->100 input->output dimensions and the second one has 100->60 input->output dimension). The output of the adversarial block is the adversarial condition (504). We add the adversarial block to isolate the latent variable from the conditions in order to fit the device distribution better.

Figure 6:
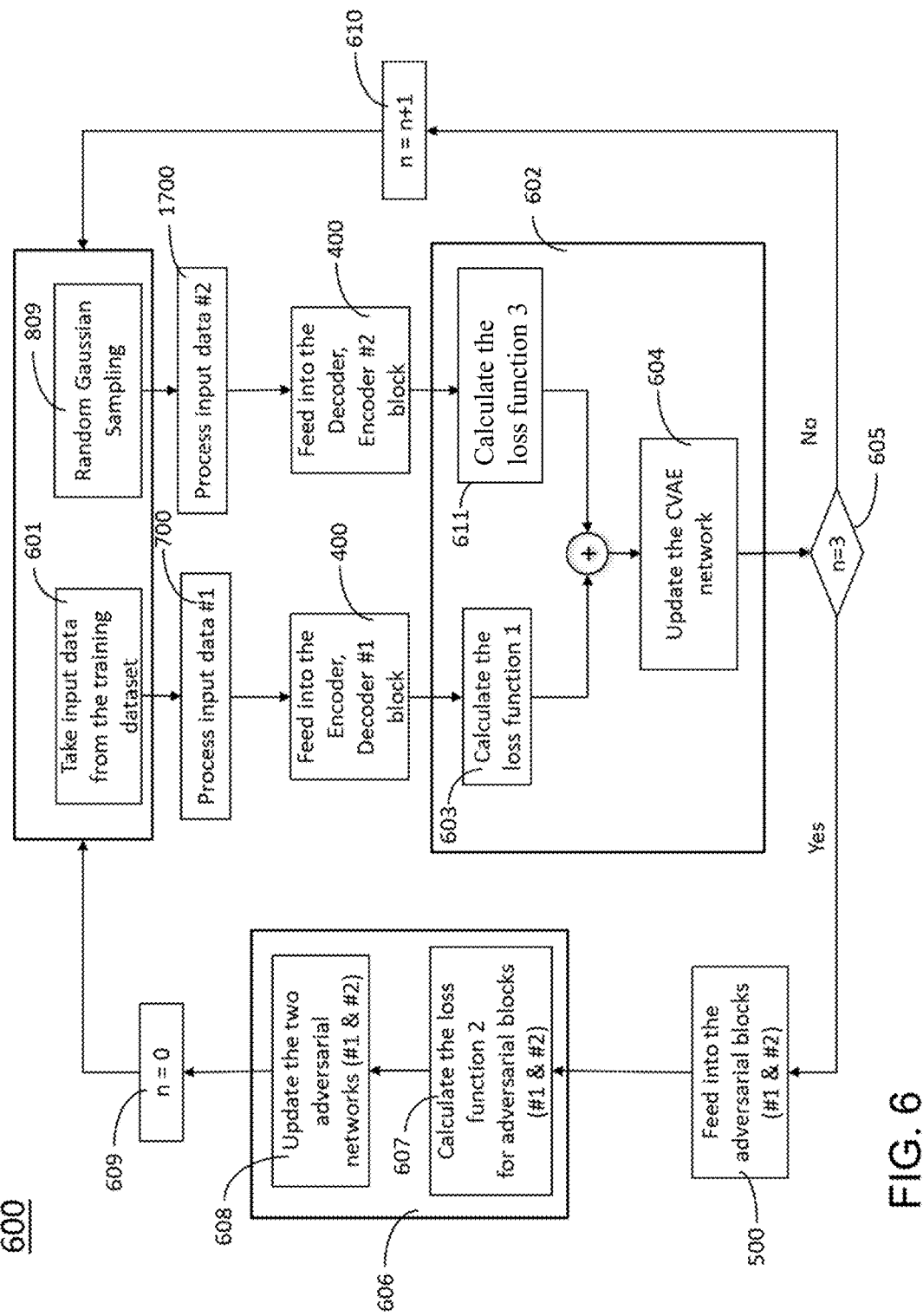
FIG. 6 shows the flowchart of the training process for the model, according to embodiments of the present invention.

FIG. 6 shows the detailed training process for the conditional Variational Autoencoder (CVAE) model 600 according to some embodiments of the present invention. This training process is performed by a computer-implemented method (algorithm/program) using a computer including a training circuitry. The training circuitry (processing circuitry) may include, for example, one or more processors, mass storage circuitry, such as a hard drive, a video/graphics controller, input/output circuitry and high speed memory, such as semiconductor memory.

First the data (input pattern and input condition) are taken from the training datasets in (601), then we process them into two channel input (301, 301') and fed into the network. The process step is shown in a flow diagram in FIG. 6, FIG. 7, and FIG. 8. The complete training iteration include two parts. Updating the CVAE network in 602 and updating the adversarial blocks in 606. The first loss function, Loss1 is calculated in 603 after the process described above. In the meanwhile, the third loss function Loss 3 (Equation 4) is calculated after the second process in 611: the random Gaussian sampling data (809) is later processed in 1700 and then fed into the decoder encoder block (or referred as an encoder decoder block) in 400 to get the second latent variable 812. The final loss will be the sum of the two loss functions (Loss1 and Loss 3) in 603 and 611 and it will be used to update the encoder and decoder blocks (CVAE network 604). The second loss function (Loss 2) is calculated in 607 after every three updates of the encoders and decoders. It is used to update the adversarial blocks only (608) (shown in Equation 3).

$$Loss1 = -[y_n \log x_n + (1 - y_n)\log(1 - x_n) + \tag{2}$$

$$\frac{1}{2}\sum_{j=1}^{J}[1 + \log(\sigma_{zj}^2)^2 - \mu_{zj}^2 - \sigma_{zj}^2] - \beta \text{MSE\_LOSS}(s, \bar{s})$$

$$Loss2 = \text{MSE\_LOSS}(s, \bar{s}) + \text{MSE\_LOSS}(s, \bar{s}') \tag{3}$$

$$Loss3 = \text{MSE\_LOSS}(z, \bar{z})$$

$$-\alpha\text{MSE\_LOSS}(s, \bar{s}') \text{ where } \text{MSE\_LOSS} = (x - y)^2 \tag{4}$$

where, $$\text{MSE\_LOSS}(x, y)=(x-y)^2$$

For Loss1, the first portion is the Binary cross entropy loss, the second part is the KL divergence loss and the third part is the Mean Square Error multiplied by a constant β to reach a training balance between the first adversarial block and the main model (encoder #1-decoder #1). For Loss3 (third loss function), the first term is the MSE loss between the normal gaussian sampling variable (809) and the second latent variable (812). The second term is the Mean Square Error multiplied by a constant α to reach a training balance between the second adversarial block and the main model (decoder #2-encoder #2). For Loss2, the loss function is the MSE loss between s and s̄, and that between s and s̄'. The network update in phase 1 is based on Loss1 and Loss3. By update the weight in the encoders and the decoders, we want to minimize Binary Cross Entropy Loss between the input (702) and the output pattern (107). We also want to minimize the MSE loss between the Standard Gaussian samples (809) and the latent variable #2 (812) In the meantime, the difference between the input condition (701) and the two adversarial conditions (505) (813) needs to be maximized so that the encoder only extracted the pattern of the input pattern. The network update in Phase 2 is based on Loss2. In this phase, only the encoder blocks and the adversarial blocks are used and only the weight parameters in the adversarial blocks are updated (608). Here the loss is the MSE Loss between the between the condition (701) and the adversarial condition (adversarial condition #1) (505). By updating the adversarial blocks, we want to minimize the MES loss to form an adversarial relation between the two blocks. In order to achieve the balance between the two phases, Phase 1 updates three times while Phase 2 updates once. In order to do that, we introduce a variable n with initial value of 0. Every time the CVAE block is finished update in (604), we check the n value in (605). If n is smaller than 3, we add 1 to n and go back to step. If the n is 3, we feed data to update the adversarial blocks (606) and rest n to 0 (through 609). In other words, the first loss function may be expressed by combination of the binary crossentropy (BCE) Loss of between the input (801) and output (107) of the first encoder decoder set and the Kullback-Leibler Divergence (KL-Divergence) between the encoded latent variable (806) and the standard Gaussian Distribution and the encoded latent variable (806) and the output of the fist adversarial block #1 (501). Further, the second loss function may be expressed by combination of Mean Square Root Loss (Mean Squared Error Loss: MSE Loss) between the encoded latent (806) and the output from the first adversarial block #1 (501) and the MSE loss between the condition between the encoded latent (812) and the output (813) from the second adversarial block #2 (501'), and the third loss function may be expressed by combination of the MSE Loss between the standard gaussian samples (810) and the second latent variables (812) and the MSE loss between the encoded latent variable #2 (812) and the output (adversarial condition #2: 813) of the second adversarial block #2 (501'). The training process can be configured to continue until predetermined datasets in the training dataset or all of the training datasets are used for the training process described above.

Figure 7:
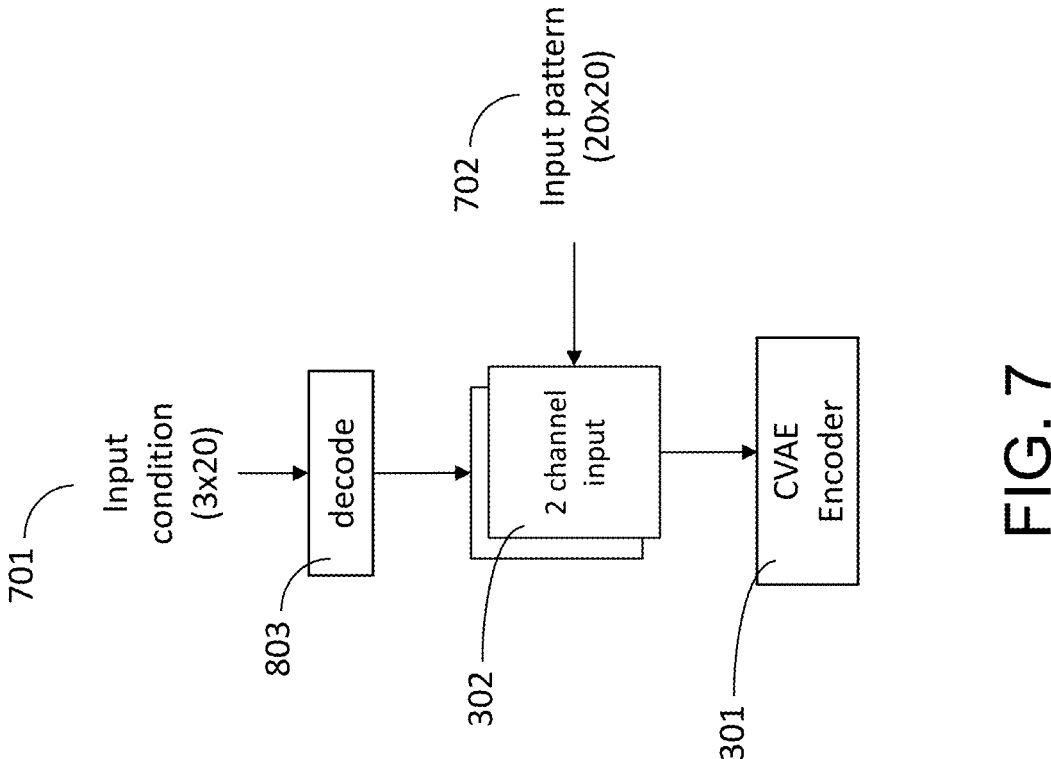
FIG. 7 shows the input data preprocess steps, according to embodiments of the present invention.

FIG. 7 shows the details to process the input data. The input data fed into the encoder network 301 (ACVAE with cycle consistency) constructed by two channels (two 20×20 matrix) 302. In this case, the first one is the 20×20 input pattern (702) and the second is the decoded (3×20) input condition (701) in 803 via the decoder.

Figure 8:
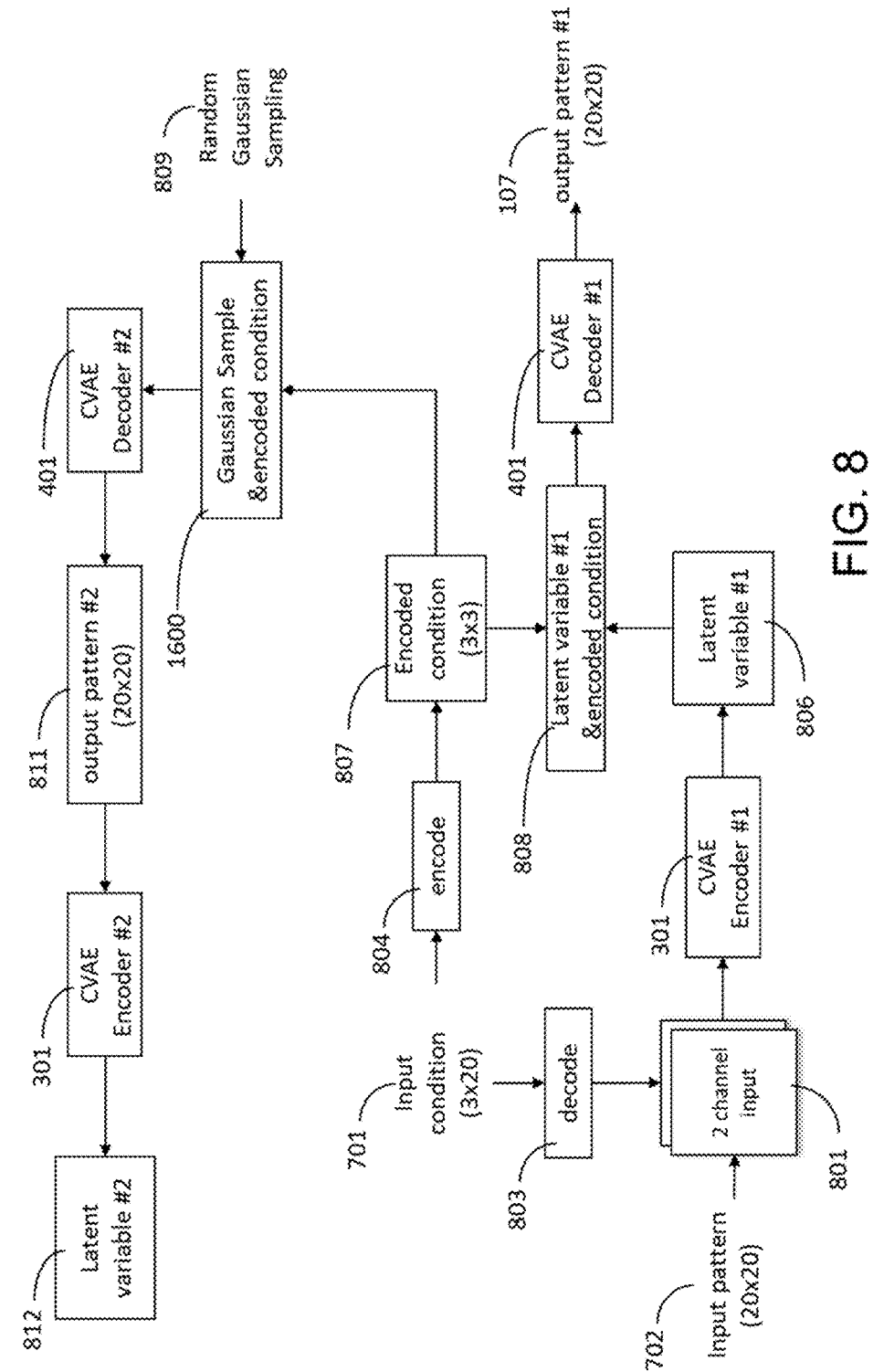
FIG. 8 shows the detailed data flow through the CVAE model, according to embodiments of the present invention.

FIG. 8 shows the dataflow 800 within the network according to some embodiments of the present invention. The input pattern data (702) and the input condition data (803) form 2-channel inputs (ports) into the CVAE encoder (301). The encoder #1 then generates the latent variable #1 with dimension of 60. Then the latent variable is concatenated with the encoded condition (807) (with dimension of 9) to form the input to the decoder #1 (808). After being processed by the decoder #1, the generated (or reconstructed) pattern #1 (107) is the output. In the meanwhile, the encoded condition is concatenated with Random gaussian sampling (809) through (1700) and is fed into decoder #2 to get the output pattern #2 (811). Then output pattern #2 will be the input of encoder #2 to get the latent variable #2.

Figure 9:
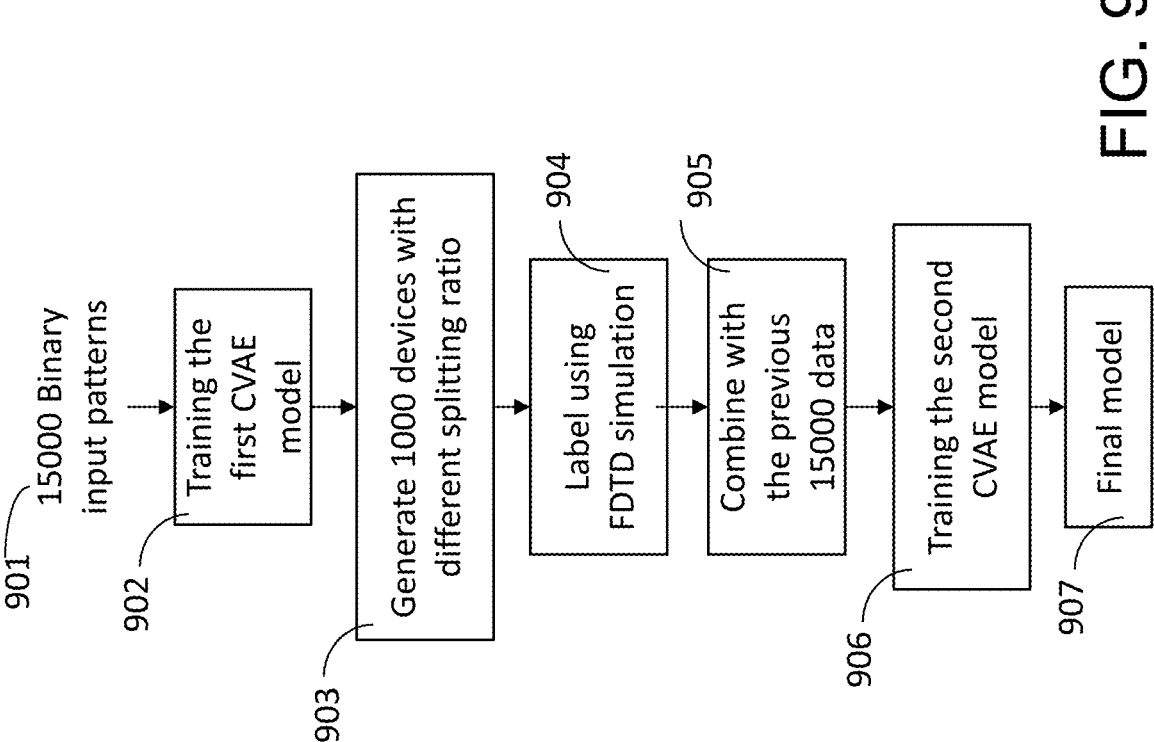
FIG. 9 shows the active learning process for generating the final model, according to embodiments of the present invention.

In order to fully train the Neural network model 200 (ACVAE with cycle consistency), we used the concept of active learning. FIG. 9 shows the flowchart of that process. To train a preliminary use the original 15,000 binary training data, after finishing the first model, we use it to generate 1,000 devices with different holes sizes and label them with their spectrum at each port (condition) through the FDTD simulation. After that, we combine the new generated data along with the existing data to form a new 16,000 dataset and retrain the model. Then the second model is the final one that is used for the device generation.

Figure 10:
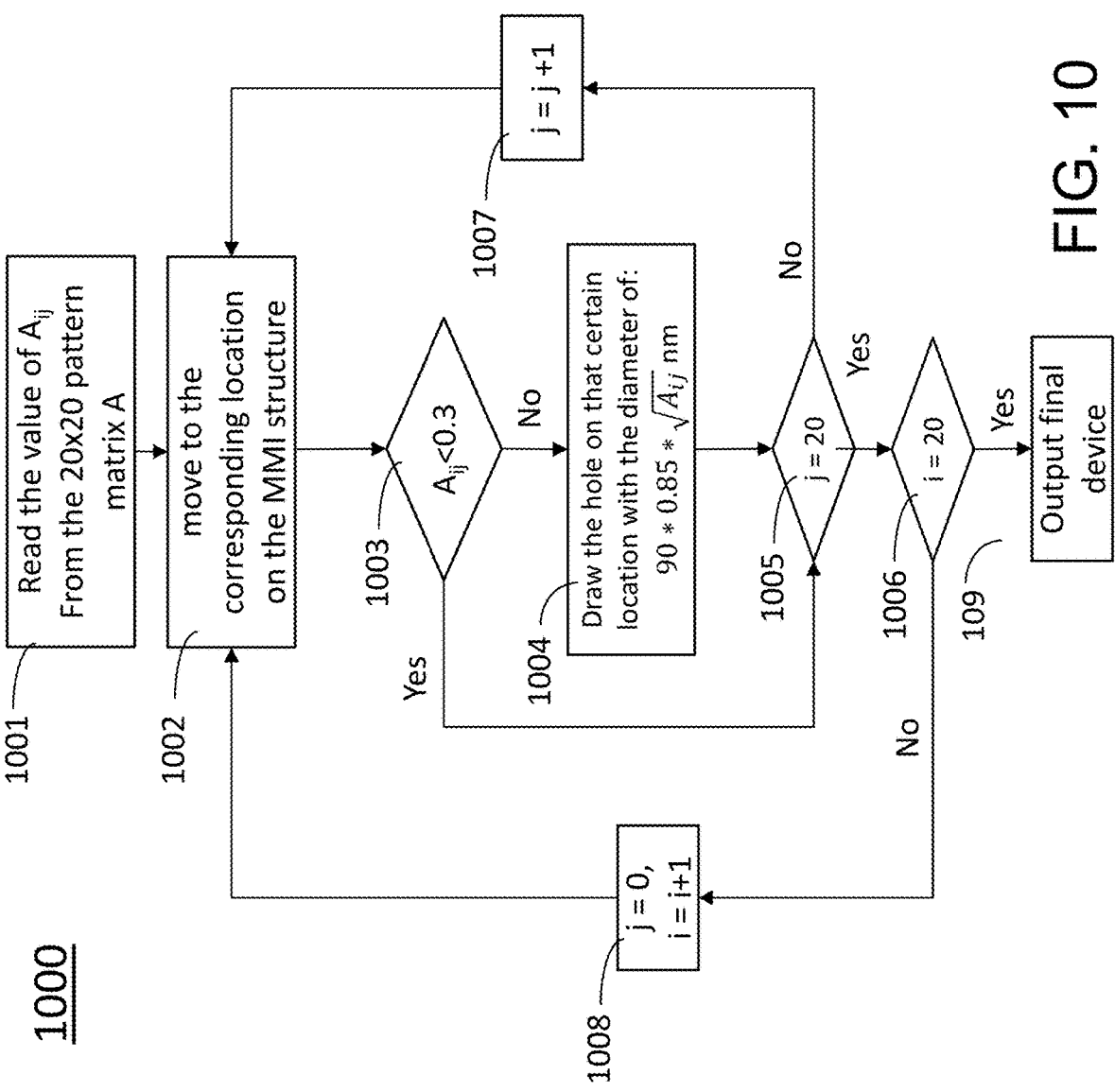
FIG. 10 shows the flowchart of the mapping algorithm of drawing the layout, according to embodiments of the present invention.

FIG. 10 shows a mapping algorithm 1,000 for drawing a layout of the actual device. The CVAE generated pattern (generated hole vector 107) is a 20×20 floating point matrix. Each point represents the Bernoulli distribution for each position point. So, the final generated patterns use the variable size instead of binary data to better represent the hole pattern and each floating number in the matrix will be treated as differential hole diameters. For instance, the maximum diameter of the hole may be 76.5 nm. For easier fabrication, a threshold 0.3 may be set to eliminate any holes that have the diameter below (90*0.85*0.3 nm) in step (1004). Once the matrix is generated and retrieved (1001), the mapping algorithm 1000 is configured to create two indexes i and j to sweep through the entire matrix (starting from i=j=0). Then the algorithm 1000 goes to the element in the matrix $A_{ij}$ (1002) and check if the value is smaller than 0.3 (1003), if it is smaller, then no holes will be created. Otherwise, a hole with the diameter of: $90*0.85*\sqrt{A_{ij}}$ nm will be created on the layout of the device. We will first do the column sweeping (1005) then the row sweeping (1006) to finish the complete process. Once the sweep is done, the final layout will be the output (109).

Some embodiments of the present invention can provide a target device structure that is based on the compact on-chip wavelength de-multiplexer (1 input and 2 output ports), which is electrically tunable with a liquid crystal (LC) as a controllable refractive index layer over nanophotonic circuits, such that the outputs are swapped when the LC is on. In other words, the core segments are arranged to swap the at least two routes when an electric field is applied to the controllable refractive index layer by use of the top electrode and the bottom electrode.

Using the LumOpt numerical package provided by Lumerical, we first perform the adjoint optimization method. For the following target responses: For T1;ON($\lambda$1), T2;ON ($\lambda$2), T1;OFF($\lambda$2), and T2;OFF($\lambda$1), the target is Thigh, while for T1;ON($\lambda$2), T2;ON($\lambda$1), T1;OFF($\lambda$1), and T2;OFF ($\lambda$2), the target is Tlow, where T1/2;ON/OFF is the transmission of silicon-on-insulator (SOI) waveguide mode from the input port to the output port 1/2, depending on the LC condition of either ON (e-axis along out-of-plane direction) or OFF (e-axis perpendicular to the input waveguide). All transmission values (performance) are averaged over 5 nm bandwidth around the target wavelengths $\lambda$1,2±2.5 nm.

Figure 11A:
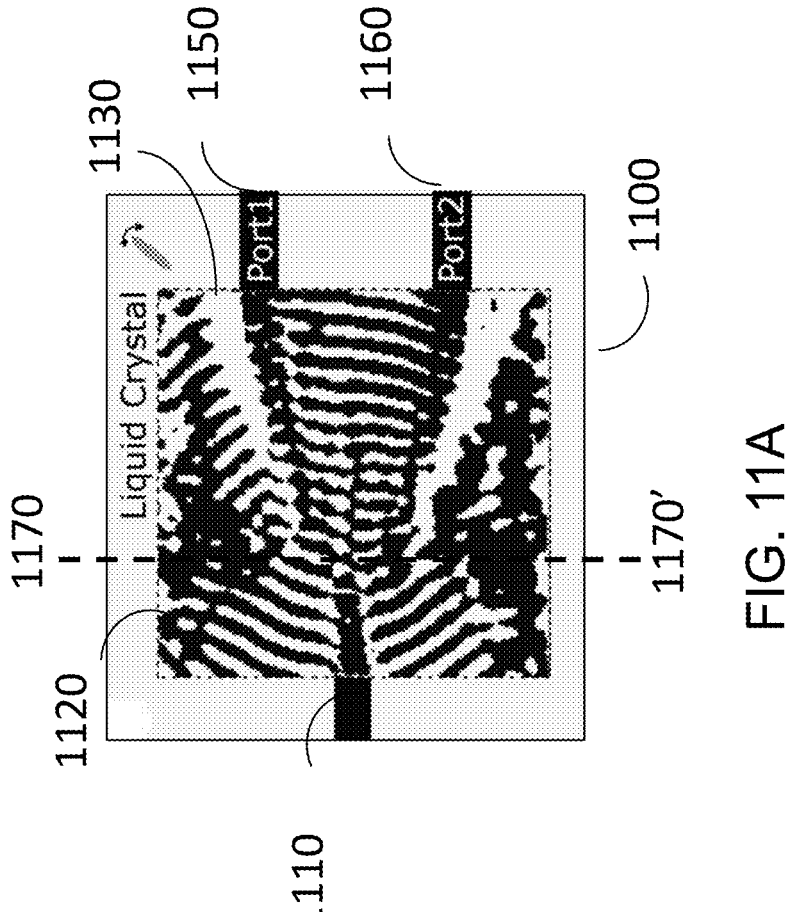
FIG. 11A shows a general structure of the reconfigurable wavelength selective splitter including an input port and a nanophotonic structure covered by liquid crystal, according to embodiments of the present invention.

FIG. 11A is the general structure of the reconfigurable wavelength selective splitter 1100 including an input port 1110, nanophotonic structure 1120 covered by liquid crystal 1130 as a controllable refractive index layer and electrode 1230 (FIG. 11B), and two output ports 1150 and 1160. In some cases, the controllable refractive index layer may include a calcogenide material, or the controllable refractive index layer may include ferroelectric liquid crystal.

Further, the controllable refractive index layer may be covered by an electrode.

Figures 11B, 11C:
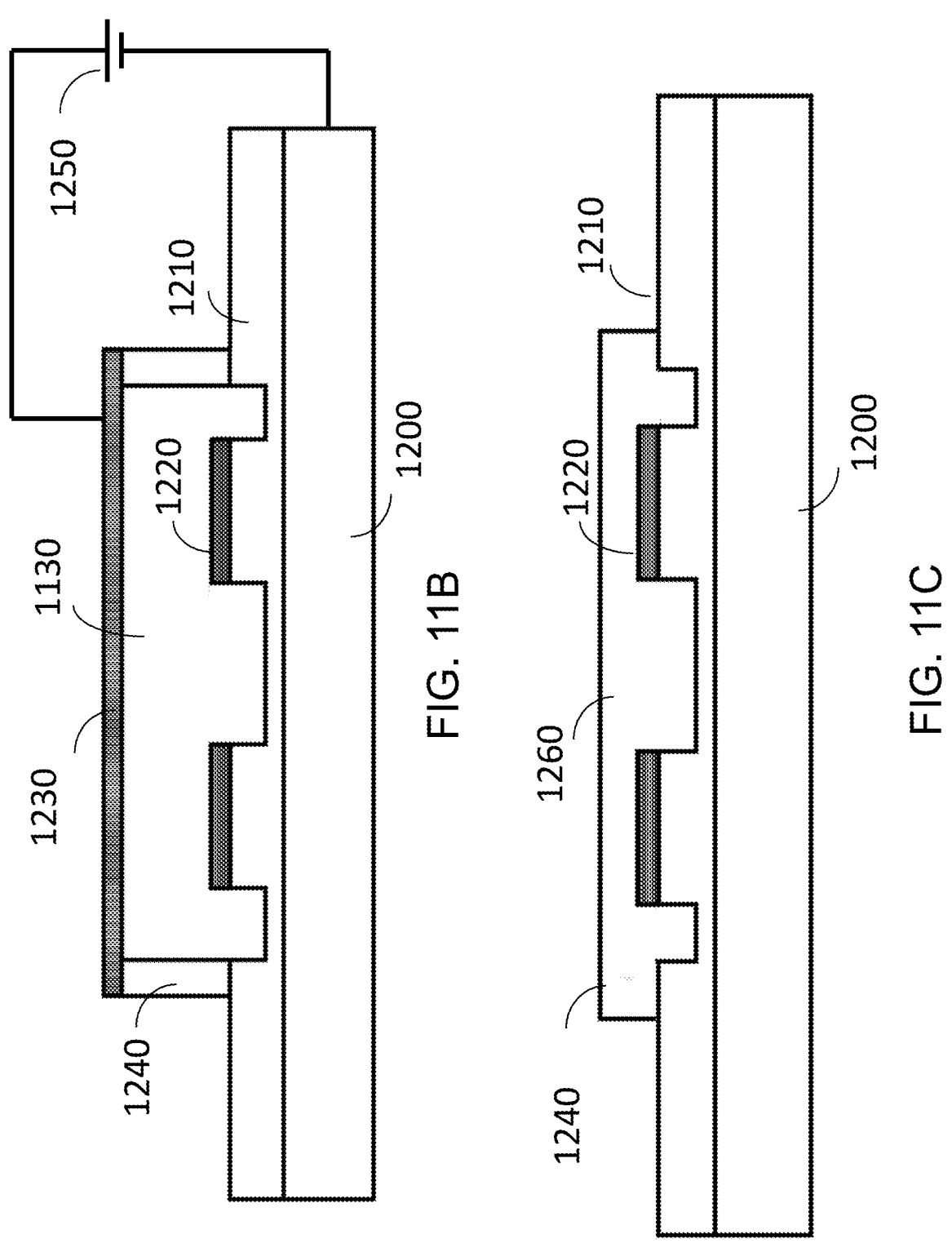
FIG. 11B shows a cross-sectional view of the reconfigurable wavelength selective splitter, according to embodiments of the present invention.
FIG. 11C shows a cross-sectional view of the reconfigurable wavelength selective splitter, according to embodiments of the present invention.

FIG. 11B is the cross-sectional view of the reconfigurable wavelength selective splitter 1100 along the line 1170. It has a substrate 1200, a cladding layer 1210, a waveguide layer 1220, liquid crystal 1130, an electrode 1230, a spacer 1240, and a voltage source 1250 to be applied between the electrode 1230 and an electrode of the substrate 1200. In some cases, the substrate may be a silicon-on-insulator substrate. In some cases, the waveguide layer 1220 may comprise of silicon nitride or silicon, or combination of thereof.

For the simulation, the waveguide layer 1220 comprises of 220 nm-thick silicon nitride whose refractive index is 2.4629 at the wavelength of 1.55 μm based on the J. Kischkat et al. (Applied Optics, vol. 51, p. 6789, 2012). The size of the nanophotonic structure used for the simulation is 8 μm×8 μm, comprising of pixels with 50 nm square. The width of the input port 1110 and output ports 1150 and 1160 is 500 nm. The center-to-center distance between the two output ports 1150 and 1160 is 2 μm.

Liquid crystal is a material whose molecule direction can be controlled by an electric field applied to the material, and the anisotropic refractive index changes according to the molecule directional change. An electric field can be applied to the liquid crystal by applying a voltage between the substrate and the electrode. For the simulation, the refractive index along the long axis is 1.685 along the long axis and is 1.500 in other directions at the wavelength of 1.55 μm.

FIG. 11C is the cross-sectional view of the reconfigurable wavelength selective splitter 1100 along the line 1170-1170'. It has a substrate 1200, a cladding layer 1210, a waveguide layer 1220, and a chalcogenite glass 1260.

The above choices of materials and parameters are for illustration purposes only, and other combination of these will also be possible.

Figures 12A, 12B:
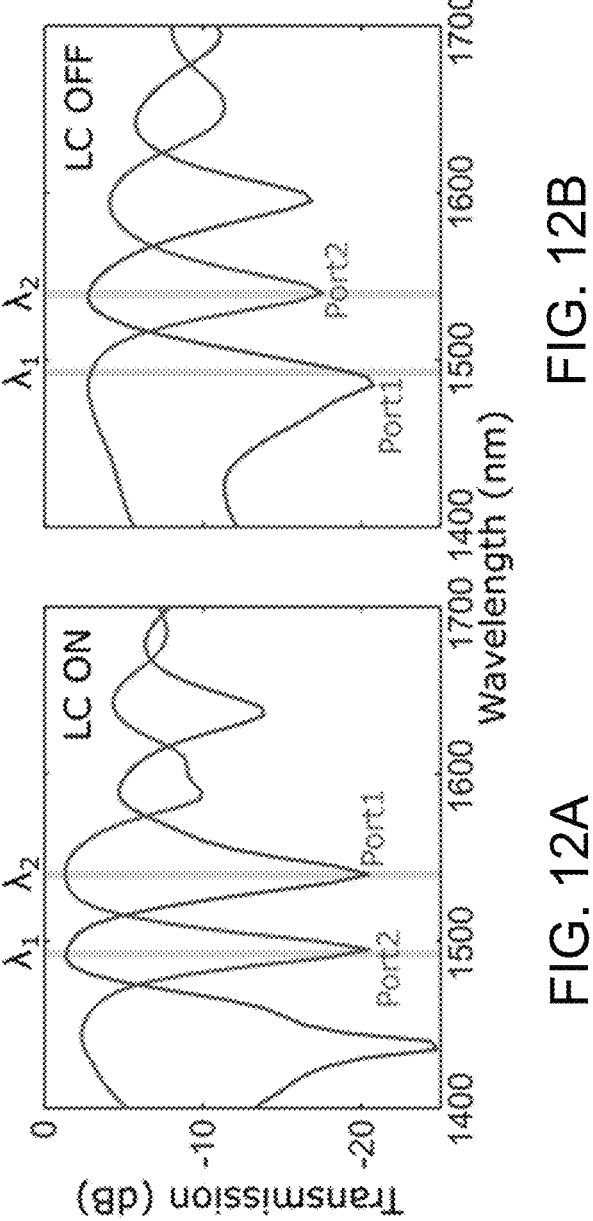
FIG. 12A shows the transmission characteristics from output port and output port as a function of the wavelength, according to embodiments of the present invention.
FIG. 12B shows the transmission characteristics from output port and output port as a function of the wavelength, according to embodiments of the present invention.

FIG. 12A is transmission characteristics from output port 1150 and output port 1160, as a function of the wavelength, when the voltage is applied to the electrode 1230, using three dimensional finite-difference time-domain (FDTD) simulations. At wavelength $\lambda$1, the majority of the input power from the input port 1110 goes to output port 1, while at wavelength $\lambda$2, most of the input power goes to output port 2. The extinction ratio of 16-17 dB is possible.

FIG. 12B is transmission characteristics from output port 1150 (port 1) and output port 1160 (port 2), as a function of the wavelength, when the voltage is not applied to the electrode 1230, using three dimensional finite-difference time-domain (FDTD) simulations. At wavelength $\lambda$1, the majority of the input power from the input port 1110 goes to output port 1, while at wavelength $\lambda$2, most of the input power goes to output port 1160 (port 2). The extinction ratio of 16-17 dB is possible.

The principle of the operation is as follows. For example, there are two valleys in the transmission characteristics from Port 1 or two peaks in the transmission characteristic from 1160 (Port 2). The two peaks and valleys at $\lambda$0 and $\lambda$2 in FIG. 12A are shifted to $\lambda$1 and $\lambda$3 in FIG. 12B, respectively. So the peaks and valleys at $\lambda$1 and $\lambda$2 are essentially switched. Therefore, it is essential that there are two valleys from one port and two peak from another port, and they are shifted according to the refractive index change.

The molecule of liquid crystal typically comes back to the original direction when the applied electric field is removed. Ferroelectric liquid crystal, a special type of liquid crystal, can maintain their molecule orientation, and the refractive index change can be retained for a long time. Therefore, the device operation can be non-volatile, and continuous voltage application is not necessary.

The chalcogenide glasses are based on Group 16 elements of the Periodic Table: S, Se and Te, usually formulated with additions of Group 14 and Group 15, such as the germanium and arsenic elements, respectively, to increase glass stability and robustness. whose refractive index can be controlled externally by applying a strong pulsed light. The refractive index change is non-volatile, so continuous shining of an external light is not necessary.

DNN Models

Figures 13A, 13B, 13C:
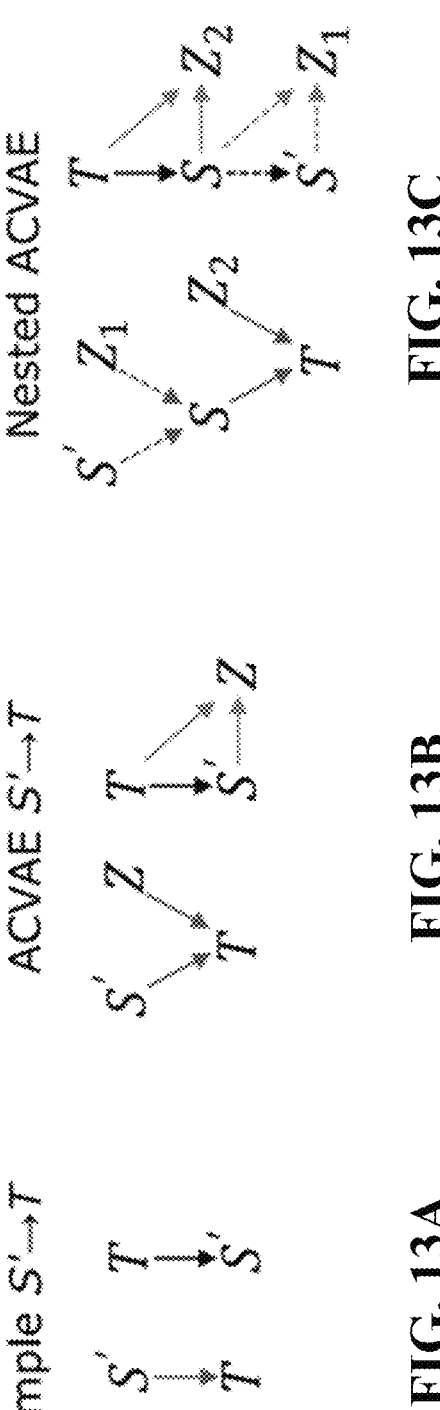
FIG. 13A, FIG. 13B, and FIG. 13C illustrate three possible ways to construct a pair of a generative model and its inference model, according to embodiments of the present invention.

The goal of the inverse design in this device is to generate a useful device topology (denoted as T), given a desired device performance, e.g., transmission spectra, target EX ratio for target wavelengths, or including target responses (denoted as S) as input condition. In principle, however, the users of a generative model may not know or care about the entire spectral response. The users' demand would be most likely in the form of some partial information of the spectra (denoted as S'), such as transmission levels at specific wavelengths $S'=[^-\lambda, \Delta\lambda, ER]$. Depending on how we make use of these system variables T, S, and S', the resulting DNN architecture will vary. FIG. 13A, FIG. 13B, and FIG. 13C illustrate three possible ways to construct a pair of a generative model and its inference model. The first model 'Simple S'→T' assumes that the device topology T depends only on the partial spectra information S'. Then, the second model 'ACVAE S'→T' assumes the existence of a latent variable Z, and ACVAE (adversarial conditional variational auto-encoder)-type DNN architecture is required. The third model 'Nested ACVAE' assumes a step-by-step statistical dependence from S' to S and to T.

Design Method

According to some embodiments, a computer-implemented method for designing a photonic device is provided using the DNN training dataset.

The DNN training dataset was prepared by the following procedure: (1) optimize a device topology targeted for $\overline{\lambda}$=1550 nm starting from a random initial condition, given a fixed separation $\lambda$2=45 nm; (2) take the topology optimized at $\overline{\lambda}$=1550 nm as the initial condition for the optimization targeting for $\overline{\lambda}$=1575 nm; (3) cascade the previous step for every 25 nm of target $\overline{\lambda}$ values; and (4) cascade the design for $\Delta\lambda$=80 nm at $\overline{\lambda}$=1500 nm and 1600 nm, and $\Delta\lambda$=60 nm and 80 nm at $\bar{\lambda}$=1450 nm and 1550 nm. The steps (1)-(4) ensure smoothness in T across varying S' within a series of such cascades. The adjoint optimization produces many (~100) intermediate sub-optimal results enroute to the final optimal design.

Some simulation results are shown in FIG. 14 and FIGS. 15A, 15B, and 15C.

Figure 14:
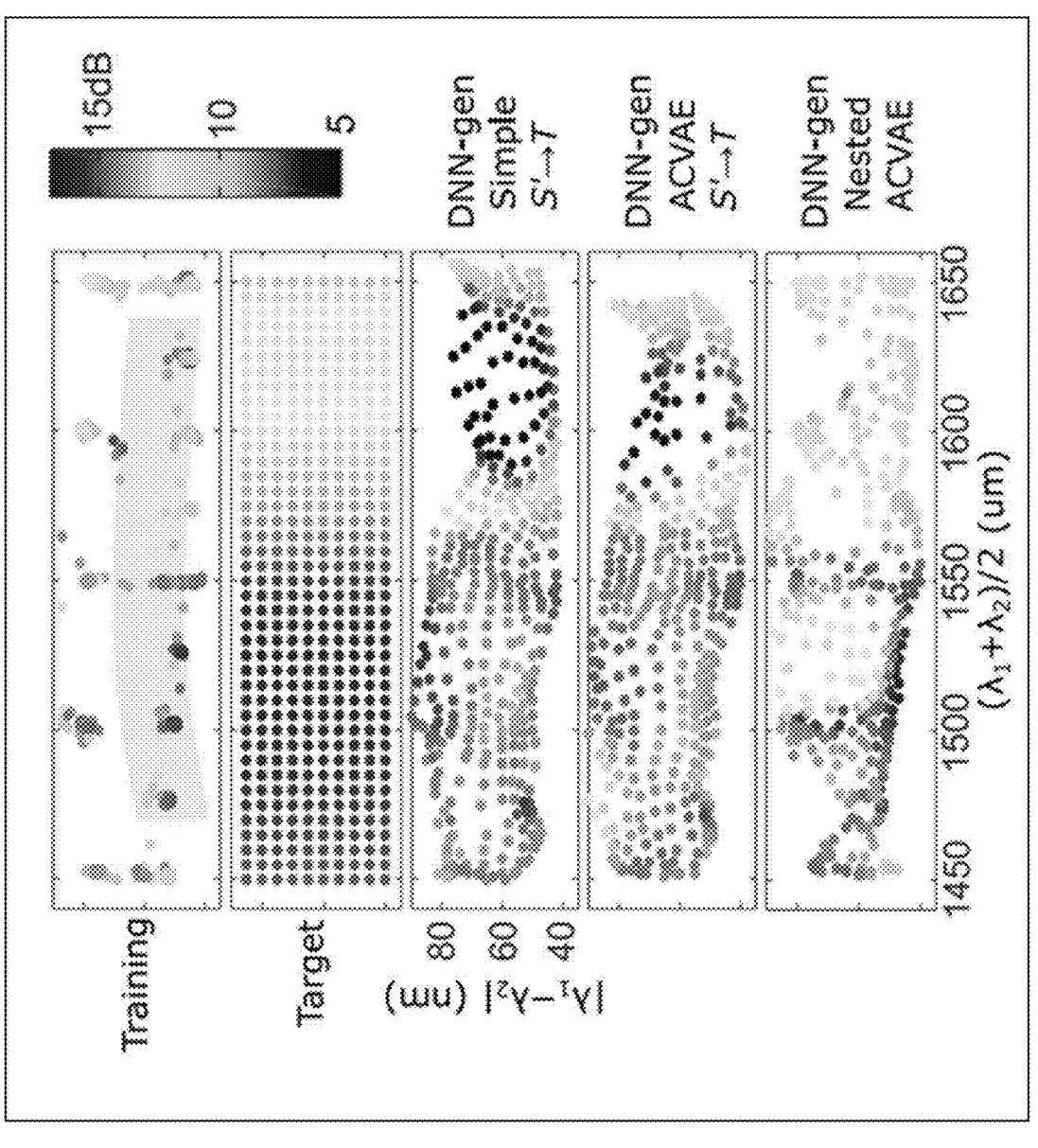
FIG. 14 shows the distribution of the training dataset devices (topmost), according to embodiments of the present invention.
Figures 15A, 15B, 15C:
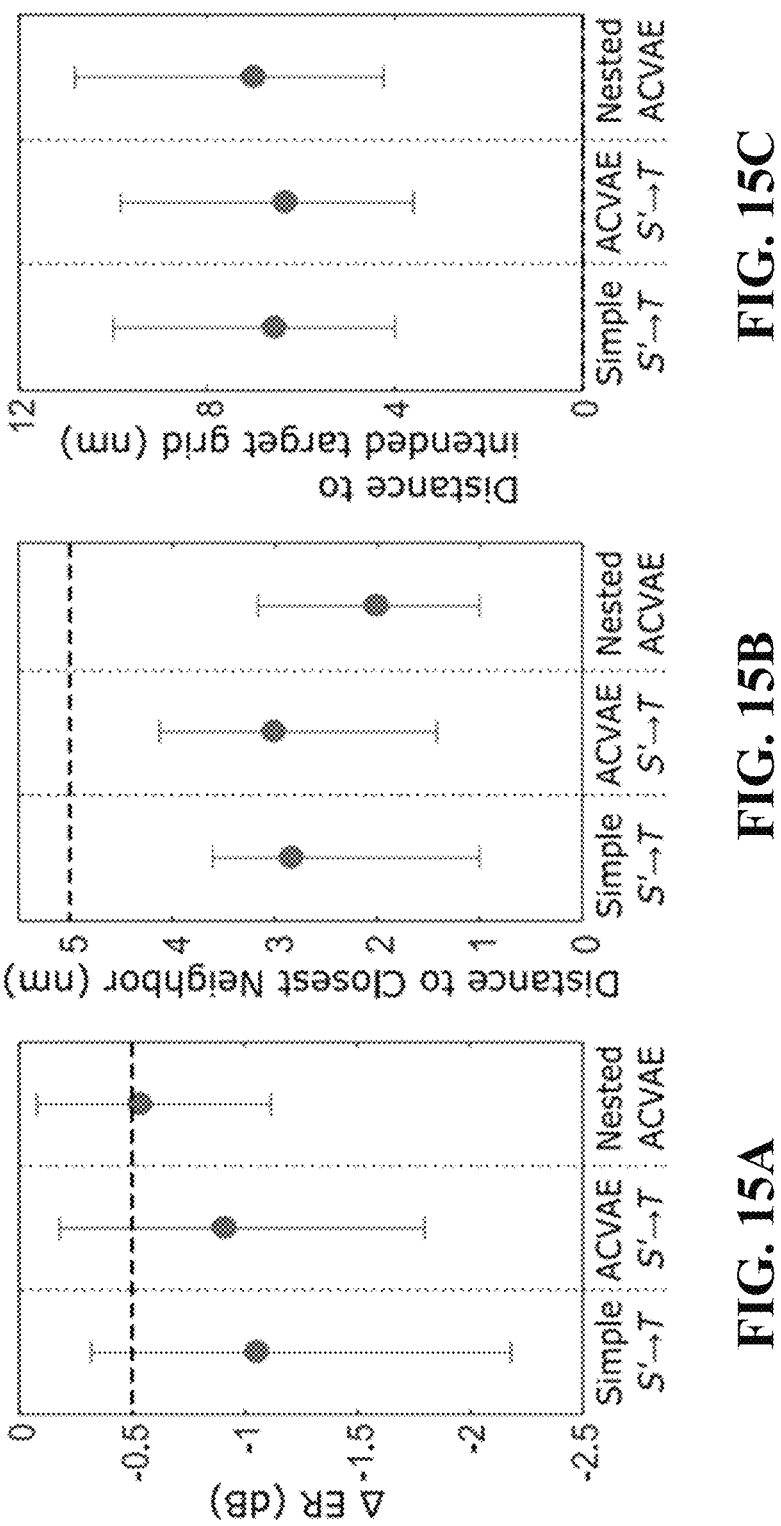
FIG. 15A, FIG. 15B and FIG. 15C show the comparison of the performance of four DNN models in terms of the ER performance, according to embodiment of the present invention.

FIG. 14 shows the distribution of the training dataset devices (topmost). Also, it shows the target S' values that we used to generate new inverse designs by trained networks (second topmost). To be specific, the target S' were given by ($\bar{\lambda}$, $\Delta\lambda$) grid points at every 5 nm in each dimension with the target ER values that are 0.5 dB higher than the values available in the training dataset. Lastly, we display the results of network validations for three different DNN models: DNN-gen simple S'->T; DNN-gen ACVAE S'->T; DNN-gen Nested ACVAE. FIG. 15A, FIG. 15B and FIG. 15C are shown to compare the performance of four DNN models in terms of the ER performance of the generated devices (left), uniform spread of generated datapoint distribution (middle), and the agreement between the intended ($\bar{\lambda}$, $\Delta\lambda$) values and the generated points (right). The dashed lines illustrate the intended performance. 'Nested ACVAE' shows the best performance compared to other models in regard to the ER, where half of the generated devices exceed the training data. In terms of smoothness of the interpolation or, in other words, uniformity of generated data point distribution, the other two networks are slightly better as seen in FIG. 14. Overall, AutoBayes model exploration reveals that the inclusion of S helps to improve the network outputs, yet slightly reduces the smoothness of the interpolation. To design one device using the adjoint method takes about 1.5 day using a computing cluster. Even though it takes 4 hours to train the DNN, to generate and validate the 410 devices takes about 9 hours. This shows that DNN has the potential to cover the whole target parameter space in a short time, without using the adjoint method to design each device individually.

As discussed above, DNN model exploration can be utilized for the efficient inverse design of tunable nanophotonic wavelength splitters. Specifically, the nested ACVAE model found in AutoBayes showed superior performance than state-of-the-art ACVAE model, achieving an average extinction ratio of about 13 dB over wide wavelengths even with a limited number of training data.

The model has been proved to generate any devices that the user wants instantly without further optimization, which significantly saves the designing time.

Note that so far nanophotonic devices with periodic holes have been described as examples. However, there are other types of optical devices. For example, the adjoint method can optimize a greater number of parameters in general. This invention can use these types of devices as training data.

The invention claimed is:

1. A reconfigurable device for splitting optical beams, comprising:

an input port configured to receive an input beam including at least two primary wavelengths;

a tunable splitter configured to separate the input beam into at least two beams via at least two routes corresponding to the at least two primary wavelengths, wherein each of the at least two routes is configured to propagate one of the at least two primary wavelengths of the input beam, wherein the tunable splitter includes a bottom electrode, a substrate on the bottom electrode, core segments arranged on the substrate, a top layer, support segments to connect the substrate and the top layer, a top electrode on the top layer, a controllable refractive index layer arranged to fill gaps between the substrate, the support segments, and the top layer; and at least two output ports configured to transmit the at least two beams propagated via the at least two routes.

2. The reconfigurable device of claim 1, wherein the core segments are arranged to swap the at least two routes when an electric field is applied to the controllable refractive index layer by use of the top electrode and the bottom electrode.

3. The reconfigurable device of claim 1, wherein the controllable refractive index layer is a liquid-crystal (LC).

4. The reconfigurable device of claim 1, wherein the substrate is a silicon-on-insulator substrate.

5. The reconfigurable device of claim 1, wherein the controllable refractive index layer is covered by an electrode.

6. The reconfigurable device of claim 1, wherein the controllable refractive index layer includes of ferroelectric liquid crystal.

7. The reconfigurable device of claim 1, wherein the controllable refractive index layer includes of a calcogenide material.

8. The reconfigurable device of claim 1, wherein the waveguide layer comprises of silicon nitride.

9. The reconfigurable device of claim 1, wherein the waveguide layer comprises of silicon.

* * * * *